United States Patent Office 2,907,783
Patented Oct. 6, 1959

2,907,783

CARBON FUNCTIONAL ORGANO-SILOXANE DIBASIC ACID ESTERS

Paul M. Kerschner, Pennsauken, and Bertrand W. Greenwald, Haddonfield, N.J., assignors to Cities Service Research and Development Company, New York, N.Y., a corporation of New Jersey No Drawing. Application June 12, 1957
Serial No. 665,128

6 Claims. (Cl. 260—448.2)

This invention relates to dibasic acid esters, and more particularly to carbon functional organo-siloxane dibasic acid esters.

In its broadest aspect, this invention relates to new carbon functional organo-siloxane dibasic acid esters prepared by reacting one mol of a carbon functional organo-siloxane dibasic acid with two mols of a carbon functional silyl alcohol. The products of the present invention are characterized by comparatively high viscosity indices, high specific gravity, low pour point and high flash point. They are also relatively stable to oxidation making them suitable as synthetic lubricants and hydraulic fluids.

The new and improved compounds of the present invention may be identified by the following general structure:

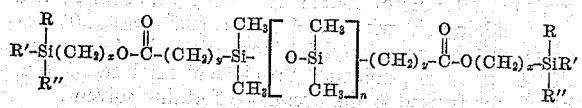

wherein $x$ is an integer from 3–8; $y$ is an integer from 2–5; $n$ is an integer from 1–6; and R, R', and R" are alkyl groups, similar or dissimilar, of branched or straight chain configuration, having from 1 to 6 carbon atoms.

With respect to the number of carbon atoms in the above generic structure represented as $-(CH_2)_x-$, $x$ has been limited to a carbon range of from 3 to 8. Such a limit provides a satisfactory product though the preferred range for $x$ of from 3 to 5 provides a product having somewhat greater oxidation stability.

With respect to the chain of the siloxane dibasic acid represented above as $-(CH_2)_y-$ a longer chain can be used such as for example where the upper limit of $y=10$ or even greater. However increasing the value of $y$ provides a less stable product and therefore $y=2-5$ is preferred. With the polysiloxane dibasic acids utilized, $n$ has a value of from 1 to 6, as stated. Conceivably, higher molecular weight polysiloxane dibasic acids could be utilized. However increasing the length of the siloxane polymer substantially above 2–6 provides a final product having undesirably high molecular weight and viscosity.

The carbon content and configuration of the R, R' and R" groups will depend on the structure of the carbon functional silyl alcohol used in preparing the ester compound.

The carbon functional organo-siloxane dibasic acid employed in preparing compounds of the general structure shown above is well known to those skilled in the art. These particular siloxane dibasic acids may be prepared by subjecting a chlorinated alkyl disiloxane to the malonic ester synthesis followed by hydrolysis and decarboxylation. When the chlorinated disiloxane includes a polysiloxane grouping, the final acid product will also include the polysiloxane structure as shown in the general formula above. A more specific description of the preparation of these carbon functional siloxane dibasic acids will be found in JACS 78, 2010 (1956).

The carbon functional silyl alcohol used in preparing these new carbon functional organo-siloxane dibasic acid esters of the present invention is obtained by first reacting a trialkyl chlorosilane with an alkyl chlorohydrin. The chloroalkoxy trialkyl silane obtained is then reacted with a second mol of trialkyl chlorosilane to produce the desired hydroxy alkyl trialkyl silane. For purposes of the present invention, the silyl alcohol employed is preferably saturated and may be of branched or straight chain configuration. A silyl alcohol in which the alkyl groups have 6 carbon atoms or less is preferred. Specifically, silyl alcohols having methyl, ethyl, propyl, butyl, amyl, hexyl groups may be used. Branched alkyl groups such as methylethyl, and ethyl hexyl are also suitable. The alkyl groups of the silyl alcohol may be of like or unlike configuration.

In carrying out the preparation of these new carbon functional organo-siloxane dibasic acid esters, the dibasic acid and silyl alcohol are reacted in the presence of an acid catalyst such as, for example, sulfuric acid, phosphoric acid, or p-toluene sulfonic acid. Other acid catalysts of a similar type may also be used. For purposes of the present invention, the p-toluene sulfonic acid catalyst is preferred.

The solvent utilized in the esterification reaction, during which water is removed in forming the final ester product, may be one of a type generally boiling at a temperature below about 140° C. Suitable solvents include toluene, benzene and xylene. The particular solvent selected should be one which will form an azeotrope boiling below the temperature of the particular silyl alcohol used in the esterification reaction.

These new compounds are generally clear liquids having a light yellow color, soluble in mineral oils and insoluble in water.

The examples which follow illustrate the manner in which these new compounds may be prepared. It is to be understood that these examples are illustrative only and are not to be construed as limiting the invention in any way.

EXAMPLE 1

20.3 grams (0.073 mol) 4,4,6,6 tetramethyl 4,6 disila 5 oxa nonanedioic acid, 31.0 grams (0.212 mol, 50% excess) (4 hydroxy butyl-1) trimethyl silane, 0.05 gram p-toluene sulfonic acid (catalyst), and 200 cc. of toluene (solvent) are placed in a 500 ml., three-neck round-bottom flask provided with a mechanical stirrer, a reflux condenser fitted with a water trap, and a thermometer. These reactants are mixed, and heated under reflux at a temperature of about 110° C. until the theoretical amount of water of esterification is recovered. The time required to accomplish the esterification is about four hours. After the theoretical amount of water is recovered, the reaction mixture is cooled, washed with water, 10% sodium bicarbonate, and again with water, to remove any unreacted acid and catalyst. The toluene solvent and excess alcohol are then removed from the reaction mixture by distilling at atmosphere pressure. The residue is then distilled at reduced pressure, and a compound identified as bis ((4 trimethyl silyl)-butyl) 4,4,6,6, tetramethyl 4,6 disila 5 oxa nonanedioate is recovered. Data on this compound is found in the table.

EXAMPLE 2

To a 500 ml., three-neck, round-bottom flask is added 30.6 grams (0.10) 5,5,7,7 tetramethyl 5,7 disila 6 oxa undecandioic acid, 43.8 grams (0.30 mol, 50% excess) of 4 hydroxy butyl-1 trimethylsilane, 0.07 gram of p-toluene sulfonic acid (catalyst) and 200 cc. of toluene (solvent) with mixing. The round-bottom flask is provided with a reflux condenser fitted with a water trap and a thermometer. Reflux of the reactants is carried out at a temperature of between 110° C. and 120° C. for approximately four hours. After this period of reflux, the theoretical amount of water split out during the esterification reaction will be recovered. After recovery of this amount of water, the reaction mixture is cooled, washed with water, washed with 10% sodium carbonate, and washed with water again, to remove any unreacted acid and catalyst. Excess alcohol not reacted with the acid during the esterification reaction and the toluene solvent is removed by distillation at atmospheric pressure. The residue is then distilled at reduced pressure of between 0.5 to 1 mm. Hg to yield bis ((4 trimethyl silyl)-butyl) 5,5,7,7 tetramethyl 5,7 disila 6 oxa undecandioate.

EXAMPLE 3

According to the method described in Examples 1 and 2 above, bis ((3 trimethyl silyl)-propyl) 4,4,6,6 tetramethyl 4,6 disila 5 oxa nonanedioate is prepared by reacting 27.8 grams (0.10 mol) 4,4,6,6 tetramethyl 4,6 disila 5 oxa nonanedioic acid with 39.6 grams (0.30 mol, 50% excess) of 3 hydroxy propyl-1 trimethyl silane in the presence of 0.07 gram of p-toluene sulfonic acid (catalyst). 200 cc. of toluene solvent is added to the reaction mixture and reflux continued until esterification is complete. Toluene solvent and alcohol are removed by distillation and the reaction product recovered by distillation at reduced pressure.

EXAMPLE 4

In a manner similar to that described above, bis ((3 dimethyl ethyl silyl)-propyl) 4,4,6,6 tetramethyl 4,6 disila 5 oxa nonanedioate is prepared by reacting 27.8 grams (0.10 mol) 4,4,6,6 tetramethyl 4,6 disila 5 oxa nonanedioic acid with 43.8 grams (0.30 mol, 50% excess) of 3 hydroxy propyl-1 dimethyl ethyl silane in the presence of 0.07 gram of p-toluene sulfonic acid (catalyst). 200 cc. of toluene is used as a solvent, with the final reaction product being recovered by distillation at reduced pressure.

EXAMPLE 5

According to the method described in Examples 1 and 2 above, bis ((8 trihexylsilyl) octyl) 7,7,9,9,11,11,13,13, 15,15,17,17,19,19 tetradecamethyl, 7,9,11,13,15,17,19 heptasila, 8,10,12,14,16,18 hexa oxapentacosandioate is prepared by reacting 73.2 grams (0.10 mol) 7,7,9,9,11, 11,13,13,15,15,17,17,19,19 tetradecamethyl 7,9,11,13,15, 17,19 heptasila, 8,10,12,14,16,18 hexaoxapentacosandioic with 123.6 grams (0.30 mol, 50% excess) of 8-hydroxy-octyl-1-trihexylsilane in the presence of 0.20 gram of p-toluene sulfonic acid. Reflux is then conducted until esterification is complete. This will require approximately four hours, during which time the theoretical amount of water will be removed from the reaction mixture as an azeotrope. After removal of the water of esterification, the reaction mixture is cooled, washed with water, washed with 10% sodium carbonate, and washed again with water to remove any unreacted acid and catalyst. Excess alcohol not reacted during the esterification reaction, together with toluene solvent, is removed by distillation at atmospheric pressure. The final reaction product is recovered by distillation at a reduced pressure of between .5 to 1 mm. of mercury.

EXAMPLE 6

In a manner similar to that described above bis ((3-trimethylsilyl) propyl) 7,7,9,9,11,11,13,13,15,15,17,17, 19,19 tetradecamethyl, 7,9,11,13,15,17,19 heptasila, 8,10, 12,14,16,18 hexaoxa, pentacosanedioate is prepared by reacting 73.2 grams (0.10 mol) of 7,7,9,9,11,11,13,13, 15,15,17,17,19,19 tetradecamethyl 7,9,11,13,15,17,19 heptasila, 8,10,12,14,16,18 hexaoxa pentacosandioic acid with 39.6 grams (0.30 mol, 50% excess) of 3-hydroxy propyl 1-trimethylsilane in the presence of 0.20 gram of p-toluene sulfonic acid. 500 cc. of toluene is used as an azeotrope forming solvent. The final product identified above is recovered by distillation at a reduced pressure of 1 mm. Hg.

EXAMPLE 7

According to the method described in Examples 1 and 2 above, bis ((8-tri-methylsilyl) octyl) 7,7,9,9,11,11,13, 13,15,15,17,17,19,19 tetradecamethyl, 7,9,11,13,15,17,19, heptasila, 8,10,12,14,16,18 hexaoxa-pentacosanedioate is prepared by reacting together in the presence of 500 cc. of toluene 73.2 grams (0.10 mol) of 7,7,9,9,11,11,13,13, 15,15,17,17,19,19 tetradecamethyl 7,9,11,13,15,17,19 heptasila, 8,10,12,14,16,18 hexaoxapentacosanedioate with 60.6 grams (0.30 mol, 50% excess) of 8-hydroxy octyl-1 trimethylsilane 0.20 gram of p-toluene sulfonic acid catalyst is added to the reaction mixture. The mixture is then refluxed with water of esterification being recovered in the trap provided. After the theoretical amount of water has been recovered indicating substantial completion of the esterification reaction, the reactant mixture is cooled, washed with water, washed with 10% sodium carbonate solution, and washed again with water to remove unreacted acid and catalyst. Excess of the silyl alcohol not utilized during the esterification reaction together with toluene solvent, is removed by distillation at atmospheric pressure. The final reaction product is recovered by distillation at a reduced pressure of about 1 mm. of mercury.

EXAMPLE 8

In a manner similar to that described in the foregoing examples bis ((8-trihexylsilyl) octyl) 4,4,6,6, tetramethyl 4,6 disila 5-oxanonanedioate is prepared by reacting 27.8 grams (0.10 mol) of 4,4,6,6 tetramethyl, 4,6 disila, 5-oxa-nonanedioic acid with 123.6 grams (0.30 mol, 50% excess) of 8-hydroxy octyl-1 trihexylsilane in the presence of 0.20 gram of p-toluene sulfonic acid catalyst. 500 cc. of toluene is used as the azeotrope forming solvent.

EXAMPLE 9

Bis ((3-trimethylsilyl) propyl) 7,7,9,9 tetramethyl 7,9 disila 8-oxa-pentadecanedioate is prepared by reacting 36.2 grams (.10 mol) of 7,7,9,9 tetramethyl 7,9 disila 8-oxa-pentadecanedioic acid with 39.6 grams (.30 mol, 50% excess) of 3-hydroxypropyl-1 trimethylsilane in the presence of 500 cc. of toluene. After completion of the esterification reaction, excess acid and silyl alcohol are removed by distillation, with the final reaction product identified being recovered by distillation at reduced pressure.

EXAMPLE 10

To prepare bis ((6-trimethylsilyl) hexyl) 4,4,6,6 tetramethyl 4,6 disila 5-oxa-nonanedioate, 27.8 grams of 4,4, 6,6, tetramethyl, 4,6 disila 5-oxa-nonanedioic acid are reacted with 52.2 grams of 6-hydroxy hexyl-1 trimethyl silane in the presence of 500 cc. of toluene and 0.20 gram of p-toluene sulfonic acid.

The new compounds of this invention may find application for various uses including use as synthetic lubricants, either alone or in mineral oil blends, and as hydraulic fluids or other materials of a similar nature. For example, as hydraulic fluids, these compounds possess characteristics generally similar to the characteristics required for hydraulic fluids either of the petroleum base type or the non-flammable type. As an indication of the utilization of these compounds as hydraulic fluids, comparison can be made of the properties of these compounds with the properties and characteristics of hydraulic fluids. Typical of the petroleum base hydraulic fluids is Military Specification O-5606, which requires the following properties:

Viscosity at 130° F _____ 10.0 c.s. minimum
Viscosity at −40° F _____ 500 c.s. maximum
Flash and fire point _____ 200° F. minimum In the non-flammable hydraulic fluid classification, Military Specification L-14107A is typical. This specification includes the following requirements:

Viscosity at 100° F _____ 5.8 c.s. minimum.
Viscosity at −65° F _____ 900 c.s. maximum.
Flash point _____ 325° F.
Pour point _____ −75° F.
Neut. No _____ 1.0 maximum.

In addition to their use as hydraulic fluids, the compounds of the present invention possess properties and characteristics which make them suitable as synthetic lubricants. When employed in mineral oil compositions, they can be admixed with lubricating oils or distillates derived from paraffinic, naphthenic, asphaltic, or mixed base crudes. Blended mineral oil compositions utilizing the new compounds of the present invention may also include various additives such as anti-oxidants, pour point depressants, thickeners, soaps, dyes, etc. as required by the particular use for which the blended composition is contemplated.

It is generally recognized that in order to furnish satisfactory lubrication, a lubricant must have certain minimum viscosities, pour point, flash and minimum fire point values. For example, lubricants for conventional internal combustion engines should have a viscosity at 210° F. of at least 1.5 cs.; and at 100° F. a viscosity of at least 10 cs. When other use of such lubricants is contemplated, such as, for example, in jet engines which operate at higher temperatures than the conventional internal combustion engine, the specification requirements for the lubricant are somewhat higher.

Representative of the products of the present invention having properties which make them suitable lubricants or hydraulic fluids is the compound prepared according to Example 1, bis ((4 trimethyl silyl)-butyl) 4,4,6,6 tetramethyl 4,6 disila 5 oxa-nonanedioate. The important properties of this compound are set forth in the following table.

Table
BIS ((4 TRIMETHYL SILYL)-BUTYL)4,4,6,6 TETRAMETHYL 4,6 DISILA 5 OXA-NONANEDIOATE

| | |
|---|---|
| Boiling range | 155–188° C. at 40–250 Hg. |
| Refr. index 25°D | 1.4457. |
| Density 25°/25° | 0.9264. |
| Visc.: | |
| 100° F., cs | 10.89. |
| 210° F., cs | 2.92. |
| Viscosity index | 140. |
| Pour point | <−60° F. |
| Flash point | >200° F. |

| | Theoretical | Found |
|---|---|---|
| Sap. No | 210 | 206 |
| Mol. Wt | 534 | 502 |
| Percent Silicon | 21 | 22 |

The above data indicates the suitability of the new esters of this invention as lubricants or hydraulic fluids. This is particularly so with respect to such uses as are set forth in the military specifications noted. It will be seen that the viscosity, viscosity index, and pour and flash points come generally within a typical non-flammable hydraulic fluid such as Mil Spec. L-14107A.

It will be apparent that modifications and changes may be made to this invention without departing from the scope hereof. Only such limits should be imposed herein as are required by the claims appended hereto.

We claim:

1. A synthetic lubricating oil having improved stability, and lubricity at high and low temperatures which comprises a compound having the formula:

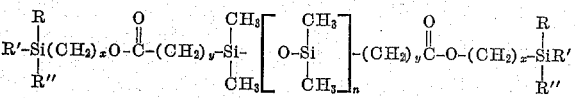

wherein $x$ is an integer from 3 to 8; $y$ is an integer from 2 to 5; $n$ is an integer from 1 to 6; and R, R′, and R″ are alkyl groups having from 1 to 6 carbon atoms.

2. As a synthetic lubricating composition having improved lubricity characteristics the compound bis ((4 trimethylsilyl)-butyl) 4,4,6,6 tetramethyl 4,6 disila 5 oxa nonanedioate.

3. As a synthetic lubricating composition having improved lubricity characteristics the compound bis ((4 trimethylsilyl)-butyl) 5,5,7,7 tetramethyl 5,7 disila 6 oxa undecandioate.

4. As a synthetic lubricating composition having improved lubricity characteristics the compound bis ((3-trimethylsilyl)-propyl) 4,4,6,6 tetramethyl 4,6 disila 5 oxa nonanedioate.

5. As a synthetic lubricating composition having improved lubricity characteristics the compound bis ((3 dimethylethylsilyl)-propyl) 4,4,6,6 tetramethyl 4,6 disila 5 oxa nonanedioate.

6. As a synthetic lubricating composition having improved lubricity characteristics the compound bis ((8-trihexylsilyl)-octyl) 7,7,9,9,11,11,13,13,15,15,17,17,19,19 tetradecamethyl 7,9,11,13,15,17,19 heptasila 8,10,12,14,16,18 hexaoxapentacosandioate.

References Cited in the file of this patent
UNITED STATES PATENTS

| | | |
|---|---|---|
| 2,589,446 | Sommer | Mar. 18, 1952 |
| 2,629,727 | Speier | Feb. 24, 1953 |
| 2,691,032 | Sommer | Oct. 5, 1954 |
| 2,721,856 | Sommer | Oct. 25, 1955 |

OTHER REFERENCES

Speier: "Jr. Am. Chem. Soc.," vol. 74 (1952), pp. 1003–10.